Aug. 4, 1925.
L. STEINER
1,548,391
VEHICLE
Filed Sept. 15, 1923
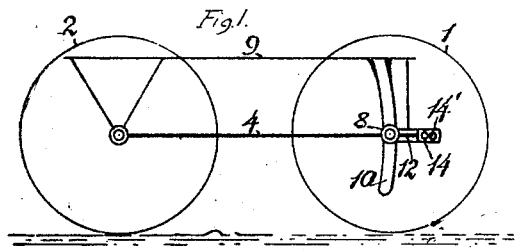
Fig. 2
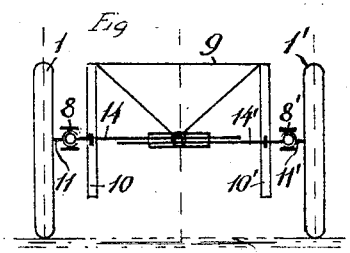
Fig. 4
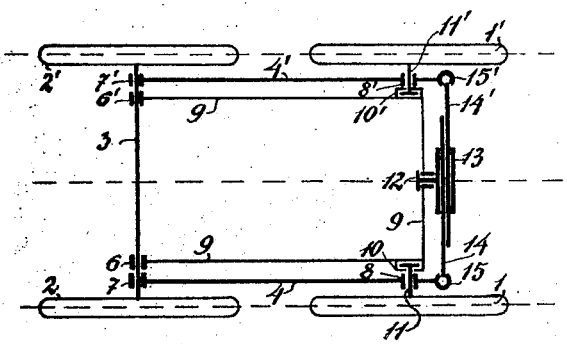
Fig. 5
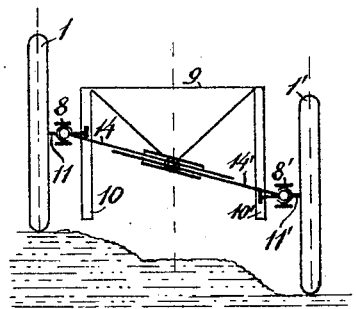
Fig. 7
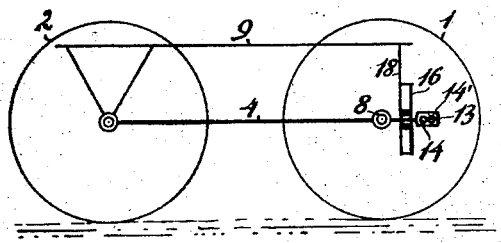
Fig. 6
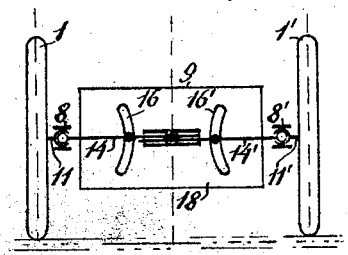
Fig. 8
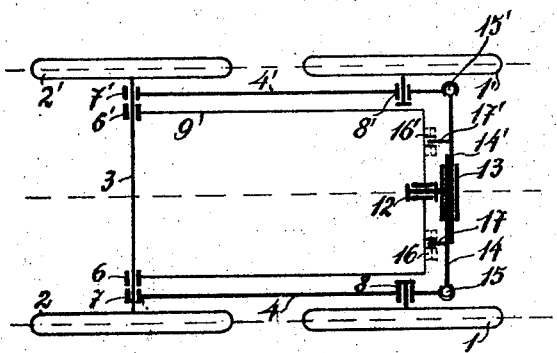
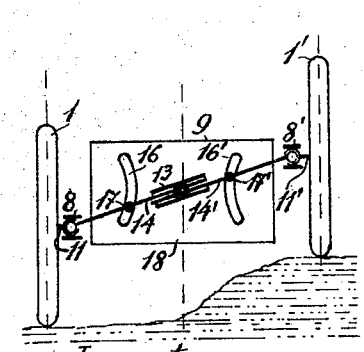
Inventor
Leo Steiner
by Otto Munk
his Attorney Patented Aug. 4, 1925.

1,548,391

UNITED STATES PATENT OFFICE.

LEO STEINER, OF BUDAPEST, HUNGARY.

VEHICLE.

Application filed September 15, 1923. Serial No. 662,842.

*To all whom it may concern:*

Be it known that I, Leo Steiner, a subject of the Kingdom of Hungary, residing at 26 Bajza Utca, Budapest, Hungary, have invented certain new and useful Improvements in Vehicles, of which the following is a specification.

This invention relates to vehicles, and more particularly to the type of vehicles having their wheels or other supporting means upon which the vehicle travels, e. g. endless track belts, mounted in rocking or tilting levers capable of oscillating movement in a vertical plane upon a cross axle journaled in the vehicle body.

The primary object of the invention is to prohibit the rocking members carrying the wheels or other supporting means from deviating from their plane of oscillation.

Another object of the invention is to provide positive connection between opposite rocking members on different sides of the vehicle as well as between the rocking members and the vehicle body or frame without interfering with the free and independent oscillating movement of the individual rocking members.

A further object of the invention is to redeem the fulcrum of the rocking members from undue stresses so that the stout-built bearings heretofore necessary for such fulcrums may be dispensed with.

In order that the principles of the invention may be clearly understood, I have disclosed two embodiments of my invention in the accompanying diagrammatic drawings wherein—

Fig. 1 is a side elevation, and Fig. 2 a plan view of the one embodiment. Figs. 3 and 4 are front views of the same embodiment showing the relative position of the parts on even and transversely uneven ground, respectively. Figs. 5, 6, 7 and 8 show the second embodiment in diagrams corresponding to the illustrations of the first embodiment in Figs. 1, 2, 3 and 4, respectively.

Similarly reference numbers refer to similar parts throughout the several figures.

Referring first to the embodiment shown in Figs. 1 to 4, the two wheels 1, 2 and 1′, 2′ of each side are mounted in opposite ends of a longitudinal rocking or tilting lever 4, 4′ arranged along the longitudinal sides of the vehicle body or frame. The rear axle 3 of the vehicle, carried in bearings secured to the vehicle body 9, constitutes the pivot for the rocking levers 4, 4′ which are mounted with their rear ends 7, 7′ on the axle 3 so that their front ends carrying the wheels 1, 1′ in bearings 8, 8′ may oscillate in vertical planes. Also the vehicle body or frame 9 is hinged at 6, 6′ to the rear axle 3 so as to oscillate thereupon in the same manner as the rocking levers 4, 4′.

The front ends 15, 15′ of the rocking levers 4, 4′ are connected by a cross link of variable length consisting of two rods 14, 14′ attached at their outer ends to the ends 15, 15′ of the rocking levers 4, 4′ and having their inner ends, which overlap each other at a relatively considerable length, guided in a sleeve 13 in such manner that both rods 14, 14′ have always the same variable direction thus forming a prolongation of each other. The sleeve 13 is pivoted at 12 to the front board of the vehicle body so as to allow the rods 14, 14′ guided therein to take different directions. The pivot 12 of the sleeve 13 constitutes simultaneously the third point of support for the vehicle body. In order to prohibit the rocking levers 4, 4′ from deviating from their plane of oscillation, guide-ways 10, 10′ of adequate curvature are provided on each side of the vehicle body engaging suitable guiding members 11, 11′ fixed to the axle of the front wheels 1, 1′ or to any part, preferably near to the front end, of the rocking levers 4, 4′.

The second embodiment diagrammatically shown in Figs. 5 to 8 differs from the first as above described only in the means for securing the rocking levers against deviation from their plane of oscillation. Here, the guide-ways are formed as curved slots 16, 16′ in the front board of the vehicle body and guiding pins 17, 17′ engaging with the slots are secured to each of the two rods 14, 14′ forming the connecting rod of variable length between the rocking levers 4, 4′. I prefer this form of construction for the guiding means, because the guide-ways may be shorter and leave the space between the wheels available.

The employed guiding means of both constructions allow the sliding rods 14, 14′ to move asunder as far as to form a connecting rod of the just length required according to the angle of inclination of the connecting rod, which is determined by the difference between the angles of tilting of the rocking levers 4, 4' on the opposite sides of the vehicle, so that the opposite rocking levers, and with them the opposite wheels 1, 1', although interconnected, are entirely free and independent of each other in their oscillations. On the other hand, in each definite position of inclination of the variable length connecting rod, the employed guiding means (of both constructions) prohibit the sliding rods 14, 14' from moving asunder as well as from moving together so long as the inclination of the connecting rod, i. e. the relative height of the opposite wheels 1, 1', does not change so that, in combination with the guiding means, the connecting rod formed by the two sliding rods 14, 14', notwithstanding its variable length, gives a rigid and positive connection between the rocking levers in every relative position of oscillation, thus securing not only parallelism but also constant distance between the rocking levers in every position of oscillation.

It should be understood that each rocking lever may include more than two wheels, and the rocking levers may have their pivots on an intermediary part between the wheels instead of being pivoted at one end. Also many other alterations of the constructions described are possible, especially endless track belts may be substituted for the wheels, without departing from the spirit of the invention.

What I claim is—

1. In a vehicle comprising rockers to carry the supporting means upon which the vehicle travels, a cross link connection between opposite rockers on different sides of the vehicle varying in length according to its angle of inclination, but rigid in its every definite position of inclination.

2. In a vehicle comprising rockers to carry the supporting means on which the vehicle travels, a connecting rod between opposite rockers on different sides of the vehicle consisting of two rods pivoted at their outer ends to the rockers and guided with their overlapping inner ends in a sleeve holding both rods in the same direction and rockably mounted to allow variations in the direction of the rods, and a guide on the vehicle body for each rocker to prohibit the rocker from deviating from its plane of oscillation.

3. In a vehicle comprising rockers to carry the supporting means on which the vehicle travels, a connecting rod between opposite rockers on different sides of the vehicle consisting of two rods pivoted at their outer ends to the rockers and guided with their overlapping inner ends in a sleeve holding both rods in the same direction and rockably mounted to allow variations in the direction of the rods, and guiding pins secured to each of said rods and engaging with guide-ways formed as curved slots in the vehicle body to prohibit the rockers from deviating from their planes of oscillation.

4. In a vehicle comprising a cross axle journaled in bearings secured to the vehicle body, two longitudinal rocking levers, one on each side of the vehicle, pivoted at one end upon said cross axle and carrying the supporting means upon which the vehicle travels, and a cross link connection between said rocking levers varying in length according to its angle of inclination but rigid in its every definite position of inclination.

5. In a vehicle comprising a cross axle journaled in bearings secured to the vehicle body, a pair of wheels on said cross axle, a pair of longitudinal rocking levers pivoted at their ends upon said cross axle to oscillate thereupon, another pair of wheels journaled in said rocking levers at their free ends, and a cross link connection between said rocking levers varying in length according to its angle of inclination but rigid in its every definite position of inclination.

6. In a vehicle comprising a cross axle journaled in bearings secured to the vehicle body at its one end, a pair of wheels on said cross axle, a pair of longitudinal rocking levers pivoted at their ends upon said cross axle to oscillate thereupon, another pair of wheels journaled in the free ends of said rocking levers, a pair of cross rods pivoted at their outer ends to said rocking levers and guided with their overlapping inner ends in a sleeve holding both rods in the same direction and rockably mounted in the vehicle body to allow variations in the direction of said pair of cross rods, and guiding pins secured to each of said cross rods and engaging with guide-ways formed as curved slots in the vehicle body to prohibit each rocker from deviating from its plane of oscillation.

In testimony whereof I affix my signature in presence of two witnesses.

LEO STEINER.

Witnesses:
 ELISABETH KATONA,
 JULIUS SCHWARZ.